United States Patent [19]
Engle

[11] Patent Number: 5,521,747
[45] Date of Patent: *May 28, 1996

[54] ELECTRONICALLY ADDRESSED DEFORMABLE MEDIA LIGHT MODULATOR

[76] Inventor: Craig D. Engle, 336 Cline Ave., Griffith, Ind. 46319

[ * ] Notice: The term of this patent shall not extend beyond the expiration date of Pat. No. 5,521,746.

[21] Appl. No.: 180,029

[22] Filed: Jan. 11, 1994

Related U.S. Application Data

[63] Continuation-in-part of Ser. No. 20,692, Feb. 22, 1993.

[51] Int. Cl.$^6$ .................................................. G02B 26/00
[52] U.S. Cl. ........................... 359/292; 359/263; 359/259
[58] Field of Search .................................. 359/290, 291, 359/292, 259, 263

[56] References Cited

U.S. PATENT DOCUMENTS

| | | | |
|---|---|---|---|
| 3,480,348 | 11/1969 | Preston, Jr. | 359/291 |
| 3,626,084 | 12/1971 | Whol | 178/7.5 D |
| 3,835,346 | 9/1974 | Mast et al. | 313/394 |
| 4,110,662 | 8/1978 | Greeneich et al. | 315/169 TV |
| 4,622,590 | 11/1986 | Togashi | 358/241 |
| 4,863,759 | 9/1989 | Warde et al. | 427/108 |
| 4,879,602 | 11/1989 | Glenn | 358/233 |
| 5,089,294 | 2/1992 | Ratcliffe | 427/108 |
| 5,116,674 | 5/1992 | Schmidhalter et al. | 428/335 |

OTHER PUBLICATIONS

Craig D. Engle patent application titles "Poppet Valve Modulator", Serial No. 08/020,692 filing date Feb. 22, 1993.
R. Tepe et al, "Viscoelastic Control Layers for Solid State Light Valves" SPIE vol. 684, Liquid Crystals and Spatial Light Modulator Materials.
O. F. Hamann, Technical Report # RADC-TR-65-451 Titled "Random Access Light Valve Study" Jan. 1966.
Larry J. Hornbeck, "Deformable Mirror Spatial Light Modulators", SPIE Critical Reviews, Series vol. 1150.
Eugene T. Kozol et al, Technical Report RADC-TR-71 Mar. 1971, Titled "Dielectric Membrane Light Valve Study".
W. Brinker et al, "Deformation Behavior of Thin Viscoelastic Layers Used in an Active Matrix Addresses Spatial light Modulator" SPIE vol. 1018 Electro-Optic and Magneto-Optic Materials.
R. Tepe et al, "Viscoelastic Spatial Light Modulator with Active Matrix Addressing " Applied Optics vol. 28, No. 22l/15 Nov. 1989.
N. K. Sheridon The Ruticon Family of Erasable Image Recording Devices.
Takeaki Ojio and Seizo Miyata, "Highly Transparent and Conducting Polypyrrole–Poly(Vinyl Alchol) Composite Films Prepared by Gas State Polymerization", Polymer Journal, vol. 18, No. 1, pp. 95–98 1986.
I. Amato, "Forging Superstrong Conducting Polymers" Science News vo. 136.
Ron Dagani "Flexible Light Emitting Diode Developed from Conducting Polymers" Jun. 29, 1992 C & E N.
L. Peterson, "Stringing Together a Conducting Window" Science News, vol. 114.
S. Jin et al "Optically Transparent Electrically Conductive Composite Medium": Science vol. 2524, Jan. 1992.
Benard J. Lechner et al, "Liquid Crystal Matrix Display" Proceedings of the IEEE vol. 59,, No. 11, Nov. 1971.
Craig D. Engle patent application titled "An Enhanced Electrostatic Shutter Mosaic Modulator" Serial No. 07/955, 058 filed Oct. 1, 1992.

*Primary Examiner*—Georgia Y. Epps
*Assistant Examiner*—Thomas Robbins

[57] ABSTRACT

A deformable media spatial light modulator utilizes a transmissive deformable media disposed between a deformable transmissive conductor and a substrate. A plurality of electrodes are affixed to the substrate. A potential control is provided to control the potential difference between each electrode and the conductor. A wavefront to be modulated is incident upon the transmissive conductor, traverses the media and is incident upon a reflector, reverses direction, traverses the media a second time and exits the modulator. By allowing the wavefront to be modulated to traverse the media, several enhancements occur including an increase in sensitivity. The increase in sensitivity exhibits a dependence upon the index of refraction of the media.

20 Claims, 2 Drawing Sheets

5,521,747

ELECTRONICALLY ADDRESSED DEFORMABLE MEDIA LIGHT MODULATOR

RELATED APPLICATION

This application is a continuation in part of earlier U.S. application Ser. No. 08/020,692 filed Feb. 22, 1993 of Craig D. Engle for "Poppet Valve Modulator" pending.

BACKGROUND

1. Field of Invention

This invention relates to electronically addressed deformable media light modulators and how to enhance the performance attainable by such devices.

2. Prior Art

As identified in the patent application admitted to Craig D. Engle titled Poppet Valve Modulator, Ser. No. 08/020,692 filing date Feb. 22, 1993, and the article "Viscoelastic Control Layers for Solid State Light Valves" by R. Tepe et al, SPIE Vol. 684 Liquid Crystals and Spatial Light Modulation Materials, spatial light modulators for use in electronic to optical data conversion applications, such as home use HDTV, are preferably electronically addressed. In addition, electronic addressing facilitates packaging.

Efficiency of a spatial light modulator is an important consideration.

Several spatial light modulators developed for applications involving electronic to optical data conversion applications have utilized a reflective deformable conductor affixed to a deformable media, such as a polymer, to impart a phase modulation to a wavefront incident upon the conductor. As identified in application Ser. No. 08/020,692, electronically addressed spatial light modulators utilizing a deformable reflective conductor suffer from multitude of complications.

As identified in U.S. Pat. No. 4,879,602, to Glenn, Nov. 7, 1989, use of a reflective, deformable conductor results in less than optimal reflectivity value for the conductor. This is attributed to compromises which must be made in the thickness of the conductor to influence the sensitivity of the surface deformations.

Impact of less than optimal reflection valves are identified in U.S. Pat. No. 4,879,602 and includes intrusion of incident light onto the photosensitive electronic addressing components. As to be shown herein, my invention enhances the sensitivity of electronically addressed deformable media light modulators without such adverse effects.

Furthermore, use of a reflective deformable conductor precludes the wavefront from traversing the deformable media. As identified in patent application Ser. No. 08/020,692, allowing a wavefront to traverse a transmissive deformable media enhances modulator sensitivity as a function of the index of refraction of the media.

OBJECTS AND ADVANTAGES

Accordingly, several objects and advantages of my invention are:
1) To identify additional electronically addressed deformable media spatial light modulator configurations which utilizes a transmissive deformable conductor disposed over a transmissive deformable media.
2) To show how a dielectric reflector affixed to a substrate is utilizable with an electronically addressed deformable media spatial light modulator.
3) To identify the advantages of utilizing a transmissive deformable conductor with a transmissive deformable media in electronically addressed spatial light modulators.
4) To identify electronic switching elements that are utilizable to electronically addressed my invention.

Further objects and Advantages of my invention will become apparent from a consideration of the drawings and ensuing description of it.

DESCRIPTION OF INVENTION

Figure 1:
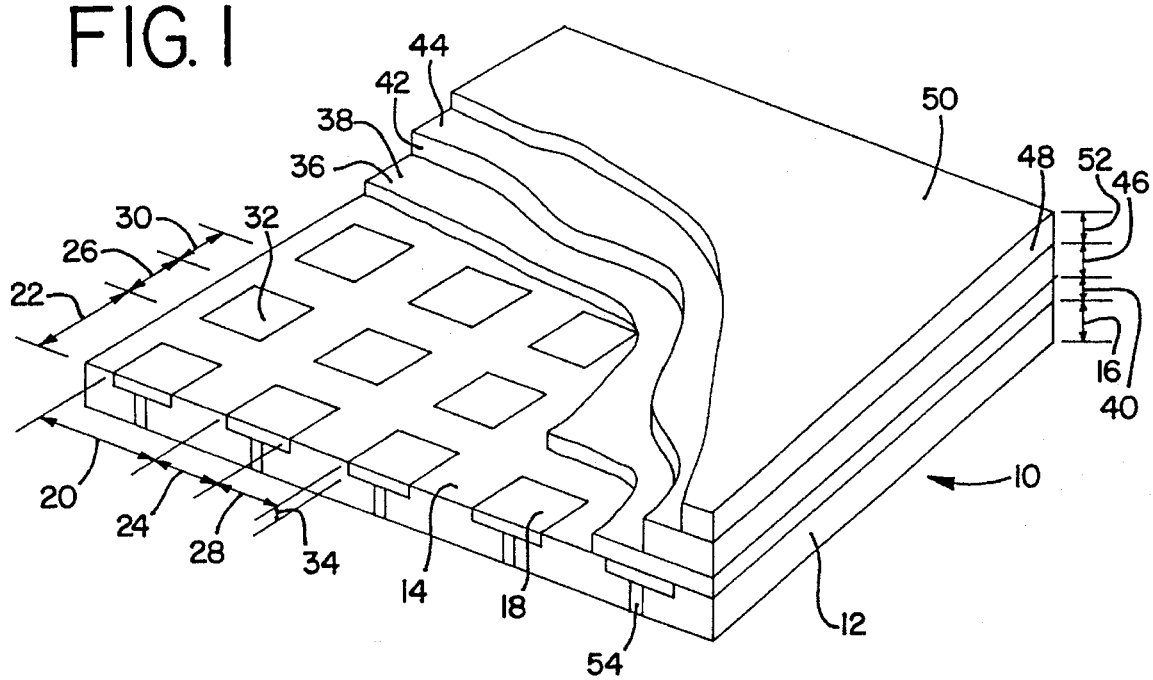
FIG. 1 shows a first surface perspective of an electronically addressed deformable media spatial light modulator.

FIG. 1 shows a spatial light modulator 10. Portions of modulator 10 are shown cut away for clarity. Modulator 10 further includes an insulating substrate 12. Substrate 12 further includes a first major surface 14 and a second major surface. The second major surface is not visible in the figure. Surface 14 and the second major surface are essentially parallel planes separated by a substrate thickness 16. Thickness 16 is perpendicular to surface 14.

Affixed to substrate 12 by a means is a plurality of electrodes 18 arranged into a matrix of p rows and q columns. Adjacent electrodes 18 in each row p are displaced by a first period 20. First period 20 is perpendicular to thickness 16. Adjacent electrodes 18 in each column q are displaced by a second period 22. Second period 22 is perpendicular to period 20 and thickness 16.

Each electrode 18 further includes an electrode width 24. Width 24 is parallel to period 20. Each electrode further includes an electrode height 26. Height 26 is parallel to period 22.

Adjacent electrodes 18 in each row p are separated by a first insulating dimension 28. Dimension 28 is parallel to period 20. Adjacent electrodes 18 in each column q are separated by a second insulating dimension 30. Dimension 30 is parallel to period 22.

Each electrode 18 further includes a first electrode surface 32 and a second electrode surface. The second electrode surface is not visible in the figure. Surface 32 and the second surface of the electrode 18 are essentially parallel surfaces separated by an electrode thickness 34. Thickness 34 is parallel to thickness 16 and perpendicular to surface 32.

Affixing electrodes 18 to substrate 12 by a means further includes surface 32 of each electrode 18 being coplanar with surface 14. Material for use as electrodes includes Aluminum. Materials for use for substrate 12 includes a photomachinable glass. Such materials are well understood by those knowledgeable in the state of the art. As identified in application Ser. No. 08/020,692, means to affix electrodes to the substrate includes selectively etching the substrate and vacuum depositing aluminium in the etched regions. Such techniques are well understood by those knowledgeable in the state of the art.

Affixed by a means to first surface 14 and to the first surface 32 of every electrode 18 is a dielectric reflector 36. Affixing the dielectric reflector to the first surface 14 and to every surface 32 is a means to affix the reflector to the substrate. Reflector 36 further includes a first reflector surface 38 and a second reflector surface. The second reflector surface of reflector 36 is not visible in the figure. Surface 38 and the second reflector surface are essentially parallel planes separated by a mirror thickness 40. Thickness 40 is parallel to thickness 16 and perpendicular to surface 38.

Methods of affixing reflector 36 to first surface 14 and the surface 32 of every electrode 18 and materials for use for reflector 36 are well understood by those knowledgeable in the state of the art. Although reflector 36 is shown as a single layer, reflector 36 is preferably a multilayer dielectric reflector. Information concerning dielectric reflectors for use in my invention are identified in the references cited herein. See for instance, information in Technical Report No. RADC-TR-65-451, Jan. 1966, titled "Random Access Light Valve Study", by O. F. Hamann. Use of a dielectric reflector affixed to the first surface of the substrate and the first surface of every electrode is a reflection means. As identified in the references provided herein, alternative reflection means exist and includes electrodes 18 being reflective.

Affixed to first surface 38 is a transmissive deformable media layer 42. Layer 42 further includes a first media layer face 44 and a second media layer face. The second media layer face is not visible in the figure. In an unenergized state, face 44 and the second media layer face are essentially parallel planes separated by a media thickness 46. In an unenergized state, thickness 46 is essentially perpendicular to face 44 and parallel to thickness 16. Methods of dispensing a deformable media layer, for use in my invention, are cited in the references provided herein.

Affixed to face 44 by a means is a transmissive deformable conductor 48. Means to affix a conducting surface to a deformable media are provided in the references cited herein. Conductor 48 further includes a first conductor surface 50 and a second conductor surface. The second conductor surface is not visible in the figure. In an unenergized state, surface 50 and the second surface are essentially parallel planes separated by a conductor thickness 52. In an unenergized state, thickness 52 is parallel to thickness 16 and perpendicular to surface 52.

The preferred transmissive deformable media material for use in my invention is a silicone rubber similar to what has been utilized in U.S. Pat. No. 3,626,084, to Whol, Dec. 7, 1971. Additional deformable media which are utilizable with my invention include the materials identified in U.S. Pat. No. 3,835,346 to Mast et al, Sep. 10, 1974 and the references cited herein.

Each electrode 18 is electrically connected to a respective electronic switching element by a feedthrough 54. The electronic switching elements of my invention are affixable to the second surface of the substrate and are not shown in the figure. Techniques for fabricating feedthroughs to function as an electrical conductor, electrically connecting an electrode affixed to the first surface of the substrate to an electronic switching component affixed to the second surface are well understood by those knowledgeable in the state of the art. See for instance information in U.S. Pat. No. 4,863,759 to Warde et al, Sep. 5, 1989.

As to be described herein an electronic circuit means is provided, which includes electronic switching elements affixed to the substrate, to control the potential difference between each electrode 18 and conductor 48. As identified in the references cited herein and the article titled "Deformable Mirror Spatial Light Modulators" by Larry J. Hornbeck, SPIE Critical Reviews Series Vol. 1150, applying a respective potential difference between each electrode 18 and conductor 48 establishes electrostatic forces between conductor 48 and the electrode 18. The electrostatic fields and/or forces are not shown in the figure.

The electrostatic forces deform a portion of conductor 48 which overlaps the electrode 18. The localized deformation of conductor 48 causes the thickness of media 42 lying underneath the localized portion of the deformed conductor 48 to vary. A wavefront to be modulated is incident upon conductor 48. Due to conductor 48 being transmissive, the wavefront traverses layer 42 and is incident upon reflector 36, reverses direction of propagation, traverses layer 42 a second time and then exists modulator 10. Variations in thickness of layer 42 phase modulate the wavefront which traverses modulator 10. The wavefront is not shown in the figure.

Information concerning the deformation of conductor 48 and layer 42 can be found in the reference titled "Dielectric Membrane Light Valve Study" by Eugene T. Kozol, et al, IBM, Technical Report RADC-TR-71, March 1971 and the references cited herein.

Electric field lines are not shown in the figure. Deformation of layer 42 is attributable to surface forces between conductor 48 and layer 42. Applying a respective potential difference between each electrode 18 and conductor 48 establishes localized deformations in the conductor 48 which overlaps the electrode 18 which is dependent upon the respective potential difference applied between conductor 48 and the electrode 18. Due to the localized deformation of conductor 48, the region of layer 42 under the localized deformation of conductor 48 diminishes in thickness. Due to material properties of layer 42 and a diminishing thickness of layer 42 between conductor 48 and the electrode 18, a portion of layer 42 in a localized region surrounding the electrode 18 varies. The thickness of layer 42 surrounding the electrode 18 increases.

Thickness variations in layer 42 lead to optical path length variations in the wavefront traversing layer 42 thereby phase modulating the wavefront. The optical path length variations are a function of the index of refraction, N, of layer 42. Variations in the optical path length lead to phase modulations of a wavefront traversing the modulator 10.

Figure 2:
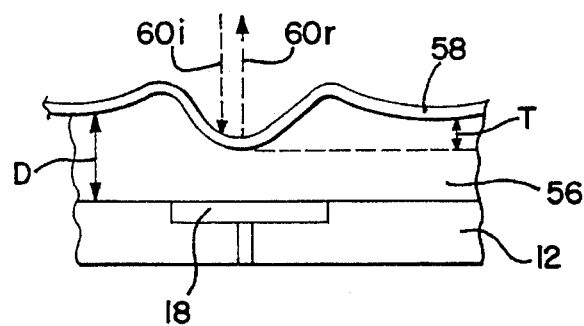
FIG. 2 shows the optical path length associated with a wavefront which is phase modulated by a prior art configuration of a reflective conductor affixed to a deformable media.
Figure 3:
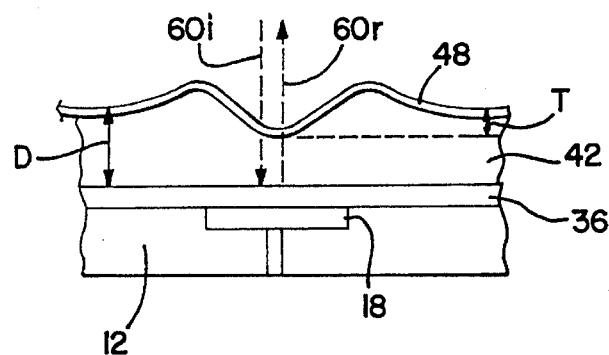
FIG. 3 shows the optical path length associated with a wavefront which is phase modulated with my invention.

FIG. 2 and FIG. 3 are provided to illustrate, in a simplified fashion, how my invention increases the sensitivity of a deformable media spatial light modulator. FIG. 2 shows a simplified view of a deformable media 56 disposed between a reflective conductor 58 and a substrate 12 which is representative of prior art. An electrode 18 is affixed to substrate 12. A circuit means is provided to apply a potential difference between conductor 58 and electrode 18. As previously explained, the potential difference leads to a localized deformation in the conductor 58. The electronic circuit means for applying the potential difference between electrode 18 and the conductor 58 is not shown in the figure.

Media 56 is given a different designation than the transmissive deformable media described in my invention to emphasize that this configuration utilizes a reflective conductor to phase modulate an incident wavefront.

The reflective conductor 58 is assumed to have a localized depression of T above a respective electrode 18. The unperturbed surface height from electrode 18 to the conductor 58 is D. An incident light ray shown as 60i is incident upon conductor 58 at the location of depression T. The light ray which is reflected is designated as 60r. Ray 60r is shown offset relative to ray 60i for clarity. Light ray 60 is representative of a wavefront which would be incident upon a spatial light modulator. Relationships involving a light ray and the wavefront associated with it, as the wavefront propagates, are well understood by those knowledgeable in the state of the art.

The reference surface, for comparison of optical path differences is taken to be the unperturbed surface height D. Accordingly, assuming the index of refraction of the region of space opposite media 56 is air and the index of refraction of air is unity, the incident ray 60i is modified in phase by an optical path that is dependent upon T prior to impinging upon reflector 58. After reflection, from the reflective conductor 58, there is a second contribution to the relative path length due to T as the wavefront propagates to the unperturbed surface 58.

FIG. 3 shows how the optical path length for a wavefront traversing the transmissive media of my invention is effected. Transmissive conductor 48 is affixed to a transmissive deformable media layer 42. Layer 42 is disposed between conductor 48 and dielectric reflector 36. Reflector 36 overlaps electrode 18. Electrode 18 and reflector 36 are affixed to substrate 12. A localized depression of T is shown in conductor 48 attributed to electrostatic forces generated from a potential difference applied between electrode 18 and the conductor 48. Electronic circuit means for generating the potential difference which leads to electrostatic forces are not shown in the figure.

Ray 60i is incident upon conductor 48 and transverses layer 42, impinges upon reflector 36, reverses direction of propagation and transverses layer 42 a second time and exits the layer 42. The index of the medium opposite layer 42 is assumed to be air with an index of refraction of unity.

The optical path difference due to traversing layer 42 is a function of the thickness of layer 42 and the index of refraction of the layer 42.

Increasing the sensitivity of a deformable media light modulator reduces the potential difference required to impart a desired phase modulation.

Use of a dielectric reflector provides several advantages in my invention. Use of a dielectric reflector provides a high reflectance value independent of the deformation characteristics required from the deformable transmissive conductor. This allows additional latitude in designing the conductor. In addition, as identified in the references cited herein, by eliminating the need for the deformable conductor to be reflective, the reflectance valve of my invention could be substantially higher than prior art, resulting in more efficient modulator than in prior art which utilizes a deformable reflective conductor.

In addition, by utilizing a dielectric reflector to overlap the electrodes 18, electrodes 18 are not required to be reflective. Not requiring the electrodes 18 to be reflective allows more latitude in establishing the shape of an electrode 18. Although the electrodes have been shown as rectangular, any shape, include complex line contours and/or any desired geometric arrangement of electrodes are utilizable. Advantages associated with selecting a particular electrode shape includes enhancing the diffraction efficiency of my invention. See information in the articles titled "Deformation Behavior of Thin Viscoelastic layers Used in An Active Matrix Addressed Spatial Light Modulator" by W. Brinker et al, SPIE Vol. 1018 Electro-optic and Magneto-Optic Materials and "Viscoelectric Spatial Light Modulator with Active Matrix Addressing" by R. Tepe et al, Applied Optics/Vol. 28, No. 22/15 Nov. 1989.

Information concerning the advantages of a wavefront propagating through a transmissive deformable media, impinging upon a reflector, and traversing a media a second time, may be found in the articles titled "The Ruticon Family of Erasable Image Recording Devices" by N. K. Sheridon and "The Ruticon As A Projection Display Device" by N. K. Sheridon. These advantages are employed in my invention by utilizing a transmissive deformable conductor with a transmissive deformable media and a dielectric reflector affixed to the substrate. The spatial light modulator of my invention provides an enhancement in sensitivity over prior art while providing a compact electronically addressed spatial light modulator for use in electronic to optical data conversion applications.

Several materials are utilizable for the transmissive deformable conductor of my invention. As well understood by those knowledgeable in the state of the art, the transmissive deformable conductor is capable of being a transmissive conducting polymer. Transmissive conductors are well understood by those knowledgeable in the state of the art. See for instance information in the article "Highly Transparent and Conducting Polypyrrole-Poly(vinyl alcohol) Composite Films Prepared by Gas State Polymerization" by Takeaki Ojio and Seizo Miyata, Polymer Journal, Vol. 18, No. 1, pp 95–98 (1986). Mechanical properties required from a conductor to deform a media are identified in the references cited herein. Techniques for varying the properties of a polymer are well understood by those knowledgeable in the state of the art. See for instance "Forging Superstrong Conducting Polymers" Science News, Vol. 136.

Additional materials for use as a deformable transmissive conductor includes indium tin oxide. See for instance information in the article "Flexible Light Emitting Diode Developed from Conducting Polymers" by Ron Dagani, Jun. 29, 1992, C&EN. Additional information concerning transmissive conductors is provided in the article "Stringing Together a Conducting Window" by L. Peterson, Science News, Vol. 141, and "Optically Transparent Electrically Conductive Composite Medium" by S. Jin, et al, Science, Vol. 2524 January 1992. Additional information is provided in U.S. Pat. No. 5,089,294 to Ratcliffe, Feb. 18, 1992, and U.S. Pat. No. 5,116,674 to Schmidhalter et al, May 26, 1992.

Figure 4:
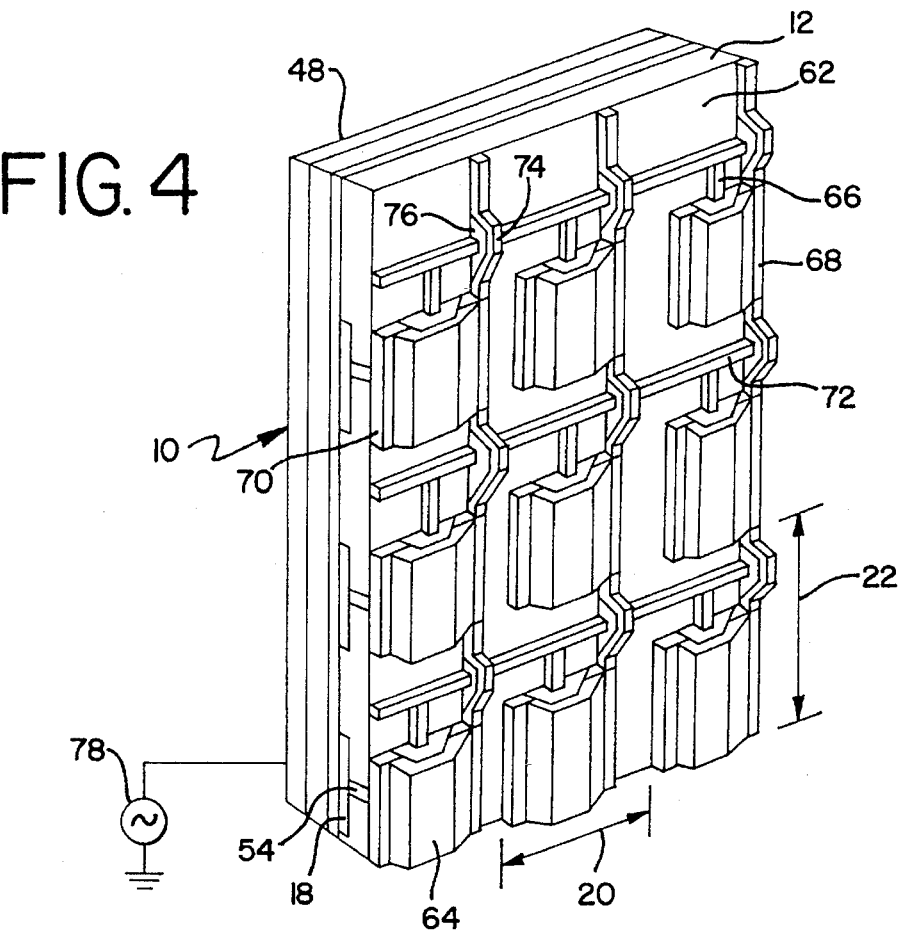
FIG. 4 shows electronic switching elements which are utilizable to electronically address my invention.

FIG. 4 shows a second surface 62 of substrate 12 of modulator 10. Affixed to surface 62 by a mean is a plurality of thin film transistors 64 arranged into a matrix of p rows and q columns. Adjacent transistors 64 in each row p are displaced by first period 20. Adjacent transistors 64 in each column q are displaced by second period 22.

Each transistor 64 further includes a gate electrode 66, a source electrode 68, and a drain electrode 70. Gate electrode 66 of every transistor 64 in each row p are electrically connected by a respective row select buss 72. Transistors 64 are drawn to depict thin film transistors in a coplanar electrode structure and such structures are well understood by those knowledgeable in the state of the art. Source electrode 68 of every transistor 64 in each column q are electrically connected by a respective column buss 74. An insulating crossover junction 76 is provided at each point where a column buss 74 overlaps a row buss 72. This avoids electrical shorts between column busses and row busses.

Techniques for fabricating crossover junctions are well understood by those knowledgeable in the state of the art.

Each electrode 18 is electrically connected to the drain electrode 70 of a respective transistor 64 by a feedthrough 54. Each electrode 18 overlaps the respective transistor 64.

Several techniques and materials are available for fabricating thin film transistors. Techniques and materials for fabricating thin film transistors are well understood by those knowledgeable in the state of the art. Thin film transistors of my invention are preferably CdSe thin film transistors. Means to affix transistors to a substrate are well understood by those knowledgeable in the state of the art. Vacuum deposition of thin film transistors is a means to affix thin film transistors to a substrate. Row busses and column busses are preferably Aluminum and are capable of being vacuum deposited to substrate 12 to affix busses to the substrate. Such techniques are well understood by those knowledgeable in the state of the art.

As well understood by those knowledgeable in the state of the art, the array of thin film transistor 64 shown in FIG. 4 are addressable on a row at a time basis to control the potential difference between each electrode 18 and conductor 48. Interface circuitry necessary for row addressing the array of thin film transistors 64 are well understood by those knowledgeable in the state of the art and are not shown in the figure. Row addressing the array of thin film transistors 64 affixed to surface 62 of substrate 12 is an electronic circuit means to control the potential difference between each electrode 18 and conductor 48 for use with the deformable media modulator of my invention.

Information for use in row addressing the array of thin film transistors in my invention include information in the article titled "Liquid Crystal Matrix Displays" by Benard J. Lechner et al, Proceedings of the IEEE Vol. 59, No. 11, Nov 1971, and U.S. Pat. No. 4,622,590 to Togashi Nov. 11, 1986, U.S. Pat. No. 4,110,662 to Greeneich et al, Aug. 29, 1978.

Conductor 48 is electrically connected to an electric potential source 78. Source 78 is maintainable at a fixed potential and is at ground potential.

Figure 5:
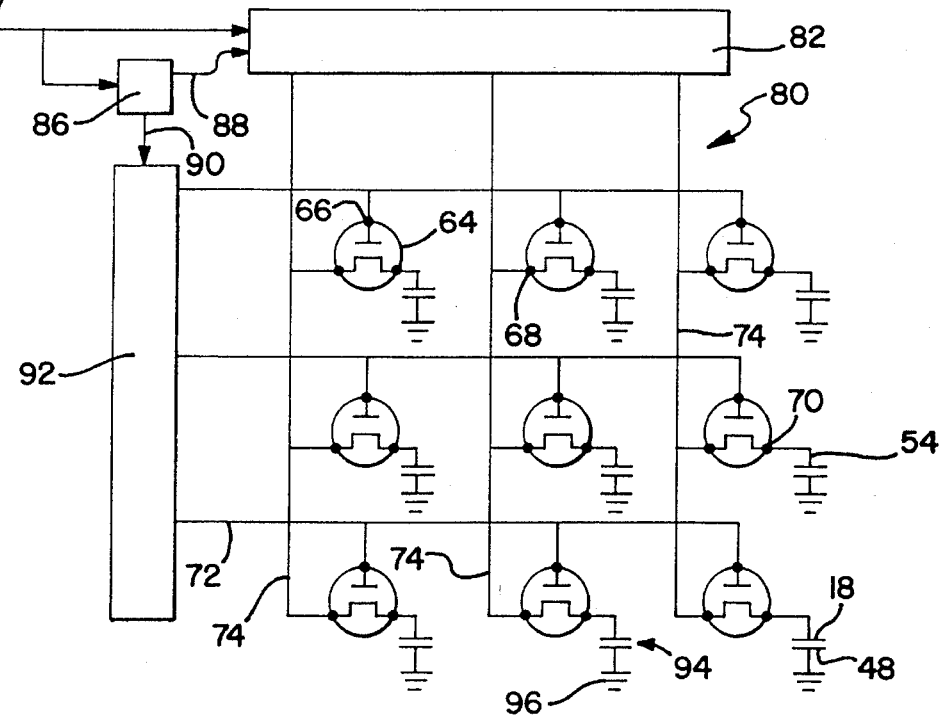
FIG. 5 shows an electronic circuit means, in schematic fashion, which is utilizable with the spatial light modulator of my invention.

FIG. 5 shows a simplified electronic circuit control means 80 for use in my invention. Means 80 further includes electrically connecting each column base 74 to a shift register interface circuit 82. A video signal 84 is input to circuit 82 and to clock means 86. Clock means 86 applies a clock signal 88 to circuit 82 and a second clock signal 90 to a row decode module 92. Each row buss 72 is electrically connected to module 92. Source electrode 68 of every transistor 64 in each column q is electrically connected by a respective column buss 74. Gate electrode 66 of every transistor 64 in each row p is electrically connected by a respective row selected buss 72. Each electrode 18 and the portion of conductor 48 overlapping the electrode 18 form a respective capacitor element 94. Each portion of conductor 48 is shown electrically connected to a ground potential 96. Electrode 18 of each capacitor 94 is electrically connected to drain electrode 70 of a respective transistor 64 by a feedthrough 54.

Circuitry for use in the shift register interface circuit 82, for row addressing my invention, are well understood by those knowledgeable in the state of the art and includes circuitry similar to what is shown in FIG. 3 of U.S. Pat. No. 4,622,590 to Togashi, Nov. 11, 1986. In a row at a time operation, video signal 84 is sampled in response to the clock signal 88 and the samples obtain during one period of signal 84 are then supplied, collectively to the column busses 74, each sample being applied to a respective buss 74.

Decoder 92 applies in secession, and in synchronism with the operation of interface 82, due to signal 90, an activation signal to each buss 72 that changes the impedance state of every transistor 64 connected to the buss 72 which is activated. This allows the video sample applied to each buss 74 to transfer charge in accordance with video signal 84 to a respective capacitor 94 in the row p of activated transistors 64. As previously identified this allows a wavefront traversing the media to be phase modulated in accordance with an information bearing signal on a row at a time basis. The activation signals generated by decoder 92 and the video samples are not shown in the figure for convenience.

CONCLUSIONS, RAMIFICATIONS AND SCOPE

Thus the reader will see that the spatial light modulator of my invention provides several advantages which enhances the efficiency of deformable media spatial light modulators. While my above description contains may specifities these should not be construed as limitations on the scope of the invention, but rather as an exemplification of one preferred embodiment. Many others are possible.

Substrates are capable of being a semiconductor substrate, similar to what is described in U.S. Pat. No. 4,879,602. Diffusion of impurities into a substrate is a suitable means to affix electronic switching components to the substrate. Accordingly, in addition to thin film transistors, several different types of electronic switching elements are utilizable in my invention.

Although the transmissive conductor of my invention is a monolithic conductor, as described in patent application Ser. No. 08/020,696 titled Poppet Valve Modulator, admitted to Craig D. Engle, filing date Feb. 22, 1993, the transmissive deformable conductor of my invention is capable of being configured to include a plurality of transmissive deformable column conductors. As identified in the references cited herein, such configurations are capable of effecting the nature of the thin film transistor matrix array utilized to electronically address the spatial light modulator of my invention.

As identified in the references cited herein, alternative electronic switching components which are utilizable with my invention includes threshold device pairs electrically connected in non opposing manner. Transmissive deformable conductor configurations for use with such electronic switching elements are identified with the references cited herein.

As identified in patent application Ser. No. 08/020,692, electrodes are capable of being reflective in my invention. As identified herein, use of a dielectric reflector provides several additional advantages. Such advantages include overlapping every electrode. This allows the electrode shape or spatial distribution to be specified without regard to how the shape effects reflectivity since the dielectric reflector precludes light from being incident on the electrodes. This provides considerable latitude in establishing the shape of electrodes. As well understood by those knowledgeable in the state of the art, changing the shape of the electrodes influences the diffraction efficiency of the deformable conductor of my invention. The benefits of electrode shaping are available in my invention with enhanced efficiency due to utilizing a dielectric reflector. In addition, more than one electrode could be considered as part of a pixel capacitor in the modulator of my invention. Examples of such electrode consideration are provided in the references cited herein. Use of a dielectric reflector affixed to the substrate is a reflection mean.

Additional aspects are addable to my invention to further enhance the performance of my invention. For instance, an antireflection coating is capable of being added to the conductor to increase efficiency and/or the index of refraction of the conductor and the deformable media layer are selectable to reduce reflections from the conductor of my invention.

Furthermore optically addressed spatial light modulators are capable of being enhanced by the use of a transmissive deformable conductor. Consequently, as well understood by those knowledgeable in the state of the art, the electronic circuit control means could be expanded in definition to include optically addressing and referred to as a means to control the potential difference between each electrode and the conductor. As previously mentioned, the potentials applied to the conductor are capable of being time dependent or dc.

Although the electronic switching elements have been described as affixed to the second surface of the substrate, electronic switching elements are affixable to the first surface of the substrate. By affixing transistors to the second surface, and overlapping each transistor with a respective electrode, an enhancement in luminous efficiency is realized. This is attributed to the fact that when affixed to opposing surfaces of a substrate, an electrode can occupy a greater percentage of the spatial period than if an electrode and transistor were affixed to the same surface. Information concerning such considerations and there impact on efficiency are identified in the patent application Ser. No. 07/955,058, admitted to Craig D. Engle titled "Enhanced ElectroStatic Shutter Mosaic Modulator" filed Oct. 01, 1992.

As previously identified, the transmissive deformable conductor is capable of being a multilayered configuration. Transmissive insulating layers are capable of being coated with a transmissive conductor, such as indium tin oxide, to allow greater freedom in establishing appropriate mechanical properties for use in my invention.

Accordingly, the scope of the invention should be determined not by the embodiments illustrated, but by the appended claims and their legal equivalents.

I claim:

1. An enhanced surface deformation type wavefront phase modulator comprising:

a substrate, reflective means integrally associated with said substrate, transmissive deformable media means exhibiting rubbery attributes, said media means further includes a first surface facing said substrate and a second surface opposite thereof, transmissive deformable conductor means affixed to said second surface of said media means, said media means is integrally associated with said substrate, said second surface of said media means is opposite said reflective means, electric field control means to apply electrostatic forces to said conductor means, means operatively associated with said control means varying said electrostatic forces which vary the deformation of said conductor means and said media means thereby phase modulating a wavefront incident on said conductor means and traversing said media means and impinging on and reflected by said reflective means to again traverse said media means and issue from said modulator.

2. The device of claim 1 wherein said reflective means is a reflective element selected from the group consisting of dielectric reflectors and reflective electrodes.

3. The device of claim 2 wherein said reflective element comprises a dielectric reflector affixed to said substrate.

4. The device of claim 3 wherein said control means further includes a plurality of first electrodes affixed to said substrate, said dielectric reflector overlaps said first electrodes, said first surface of said media means is adjacent and affixed to said dielectric reflector.

5. The device of claim 4 wherein said substrate is an insulating substrate.

6. The device of claim 5 wherein said control means further includes each said first electrode being electrically connected to a respective electronic switching element.

7. The device of claim 6 wherein each said electronic switching element is a thin film transistor, said thin film transistors are affixed to a surface of said substrate which is opposite said dielectric reflector and said media means.

8. An enhanced surface deformation type wavefront phase modulator component comprising:

a substrate, reflective means integrally associated with said substrate, transmissive electrostatically deformable media means exhibiting rubbery attributes, said media means further includes a first surface facing said substrate and a second surface opposite thereof, transmissive deformable conductor means affixed to said second surface of said media means, said media means is integrally associated with said substrate, said second surface of said media means is opposite said reflective means.

9. The device of claim 8 wherein said reflective means is a reflective element selected from the group consisting of dielectric reflectors and reflective electrodes.

10. The device of claim 9 further including electric field control means to apply electrostatic forces to said conductor means, means operatively associated with said control means varying said electrostatic forces which vary the deformation of said conductor means and said media means thereby phase modulating a wavefront incident on said conductor means and traversing said media means and impinging on and reflected by said reflective means to again traverse said media means and issue from said modulator.

11. The device of claim 10 wherein said reflective element comprises a dielectric reflector affixed to said substrate.

12. The device of claim 11 wherein said control means further includes a plurality of first electrodes affixed to said substrate, said dielectric reflector overlaps said electrodes, said first surface of said media means is adjacent and affixed to said dielectric reflector.

13. The device of claim 12 wherein said substrate is an insulating substrate.

14. The device of claim 8 further including electric field control means to apply electrostatic forces to said conductor means, means operatively associated with said control means varying said electrostatic forces which vary the deformation of said conductor means and said media means thereby phase modulating a wavefront incident on said conductor means and traversing said media means and impinging on and reflected by said reflective means to again traverse said media means and issue from said modulator.

15. The device of claim 14 wherein said reflective means is a reflective element selected from the group consisting of dielectric reflectors and reflective electrodes.

16. An enhanced surface deformation type wavefront phase modulator component comprising:

a substrate, reflective means integrally associated with said substrate, transmissive electrostatically deformable media means, said media means further includes a first surface facing said substrate and a second surface opposite thereof, transmissive deformable conductor means in contact with said second surface of said media means, said media means is integrally associated with said substrate, said second surface of said media means is opposite said reflective means.

17. The device of claim 16 further including electric field control means to apply electrostatic forces to said conductor means, means operatively associated with said control means varying said electrostatic forces which vary the deformation of said conductor means and said media means thereby phase modulating a wavefront incident on said conductor means and traversing said media means and impinging on and reflected by said reflective means to again traverse said media means and issue from said modulator.

18. The device of claim 17 wherein said reflective means is a reflective element selected from the group consisting of dielectric reflectors and reflective electrodes.

19. The device of claim 18 wherein said reflective element comprises a dielectric reflector affixed to said substrate.

20. The device of claim 19 wherein said control means further includes a plurality of first electrodes affixed to said substrate, said dielectric reflector overlaps said first electrodes, said first surface of said media means is adjacent and in contact with said dielectric reflector.

* * * * *